Figure 1:
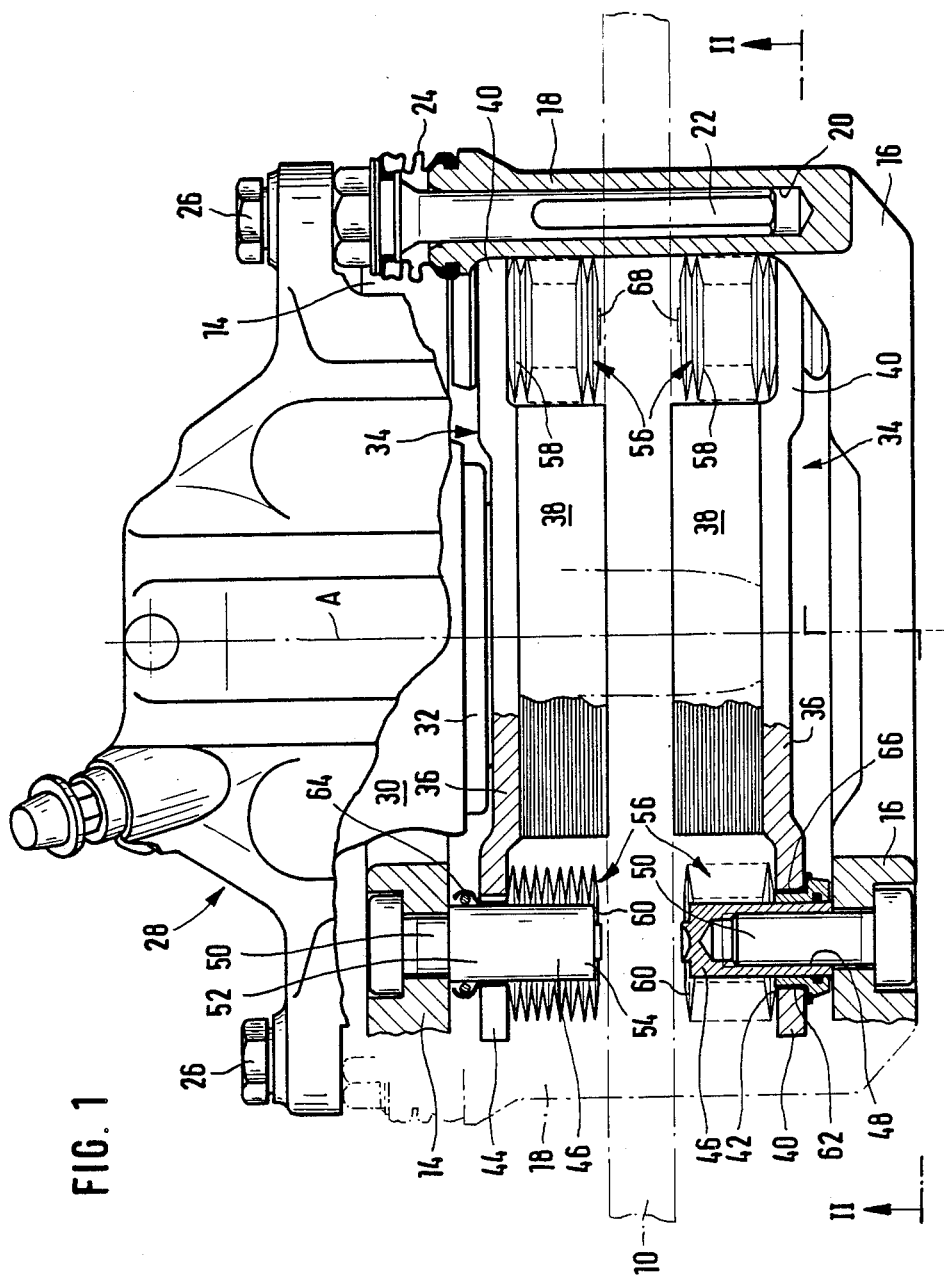

United States Patent [19]

Rath

[11] Patent Number: 4,741,419
[45] Date of Patent: May 3, 1988

[54] DISC BRAKE, ESPECIALLY FOR MOTOR VEHICLES

[75] Inventor: Heinrich-Bernhard Rath, Vallendar, Fed. Rep. of Germany

[73] Assignee: Lucas Industries, Birmingham, England

[21] Appl. No.: 40,804

[22] Filed: Apr. 21, 1987

[30] Foreign Application Priority Data

Apr. 22, 1986 [DE] Fed. Rep. of Germany ... 8611037[U]

[51] Int. Cl.[4] ..................... F16D 55/22; F16D 65/14; F16D 21/00; B61F 15/22
[52] U.S. Cl. ................. 188/72.3; 188/73.32; 188/73.45; 192/101; 277/212 FB
[58] Field of Search ................ 188/72.3, 73.31, 73.32, 188/73.33, 73.45, 73.47, 206 R, 370; 192/30 V, 101, 70.28; 277/212 FB; 92/34, 47, 168; 267/162, 182; 403/50, 51; 74/18, 18.2

[56] References Cited

U.S. PATENT DOCUMENTS 1,368,253 2/1921 Fulton ......................... 277/212 FB
2,195,663 4/1940 Wolfram ......................... 192/70.28
2,994,410 8/1961 Burnett ............................. 188/72.3

FOREIGN PATENT DOCUMENTS 3024082 6/1980 Fed. Rep. of Germany .
2023754 1/1980 United Kingdom ............. 188/73.45

Primary Examiner—Andres Kashnikow
Assistant Examiner—Robert J. Oberleitner
Attorney, Agent, or Firm—Scrivener and Clarke

[57] ABSTRACT

A disc brake comprises a pair of brake pads (34) each associated with either side of a brake disc (10). At least one brake pad (34) comprises a backplate (36) having at least one projection (40) which is free of friction lining and by which it is guided on a guide pin (46) for displacement towards the brake disc (10). The guide pin (46) is fastened at a brake carrier member (12), extends through the corresponding projection (40) into a protective sleeve (56) fixed to the same, and has a free end (54) adjacent the brake disc (10). The protective sleeve (56) is designed to be elastic in longitudinal direction and has an end (60) remote from the corresponding projection (40) of the backplate (36). This end (60) is fixed tightly at the free end (54) of the corresponding guide pin (46). The fastening of the guide pin (46) at the carrier member (12) is releasable.

7 Claims, 2 Drawing Sheets

DISC BRAKE, ESPECIALLY FOR MOTOR VEHICLES

The instant invention relates to a disc brake, especially for motor vehicles, comprising a pair of brake pads, one each associated with either side of a brake disc and at least one brake pad thereof including a backplate which has a projection free of friction lining and serving to guide the brake pad on a guide pin for displacement towards the brake disc, the guide pin being fastened to a brake carrier member, passing through the corresponding projection into a protective sleeve fixed to the same, and having a free end adjacent the brake disc.

In a known disc brake of this kind (DE-A-No. 3 024 082) each of the protective sleeves is substantially rigid and open at the end facing the brake disc. Upon brake application the protective sleeve as a whole is displaced on the respective guide pin. Thus dirt and water may enter into the end of the protective sleeve which is remote from the corresponding projection and get to the free end of the respective guide pin and even penetrate further, under unfavorable conditions, between the guide pin and the protective sleeve. If that happens, the protective sleeve no longer fully serves its purpose of protecting the guide pin from corrosion.

It is, therefore, an object of the instant invention to improve the protection afforded by such guide pins so that they perform better than before in guiding the associated brake pad with as little friction as possible, being reliable also under unfavorable operating conditions.

This object is met, in accordance with the invention, in a disc brake of the kind specified initially in that the protective sleeve is designed to be elastic in longitudinal direction and has an end remote from the corresponding projection of the backplate which end is fixed tightly to the free end of the associated guide pin, and that the fastening of the guide pin at the carrier member is releasable.

In accordance with the invention, therefore, the or each protective sleeve is fixed tightly, on the one hand, at the corresponding projection of the backplate and, on the other hand, at the free end of the corresponding guide pin. Contamination and humidity thus cannot reach that part of the guide pin which is enclosed by the protective sleeve and which is responsible for guiding the brake pad with as little friction as possible. It is the longitudinal elasticity of the protective sleeve or sleeves which permits the displacement with respect to the corresponding guide pin or pair of guide pins needed upon application of the brake pad which is guided in this manner, and upon wear thereof.

The necessary longitudinal elasticity preferably is obtained by the fact that the protective sleeve comprises a bellows.

It is especially convenient for the bellows to be made of corrosion-resistant metal and to be designed, at the same time, as a return spring for the associated brake pad.

That end of each protective sleeve which is remote from the projection of the respective brake pad preferably is given annular shape and fixed by rivets to the free end of the corresponding guide pin.

It is likewise advantageous to have that end of the protective sleeve which is fixed to the projection clamped in position by a guide bushing which encloses the guide pin.

As an alternative, the end of the protective sleeve fastened to the projection may itself be designed as the guide bushing for the guide pin.

The releasable fastening of the each or each guide pin at the carrier member preferably is obtained by the guide pin having an internal thread into which a threaded bolt is screwed which is fixed at the carrier member.

Figure 2:
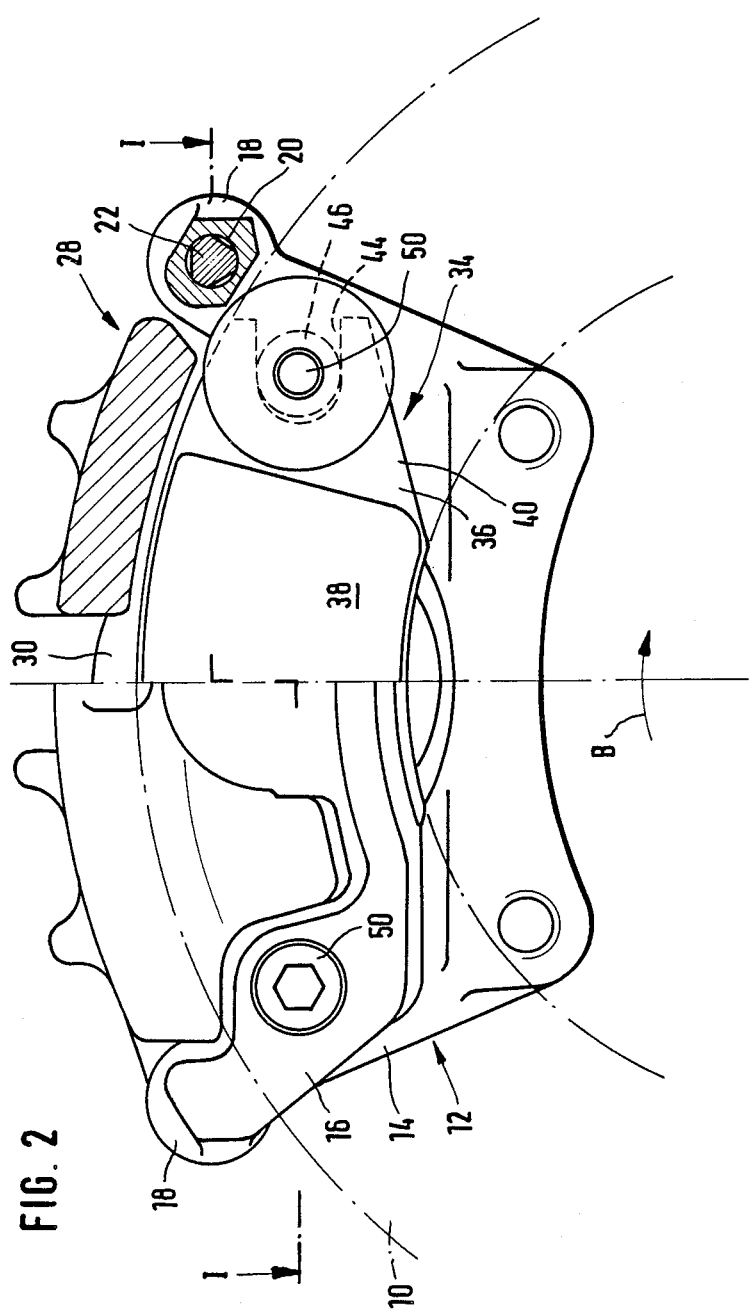

The invention will be described further, by way of example, with reference to the accompanying drawings, in which:

FIG. 1 is a top plan view, partly in section along line I—I in FIG. 2, of a disc brake according to the invention; and FIG. 2 is an elevation, partly in section along line II—II of FIG. 1, of the same disc brake, as seen from the outer side thereof with respect to the vehicle.

The disc brake shown is associated with a brake disc 10 which is indicated by dash-dot lines and the axis of which is marked A and the direction of rotation during forward travelling of the corresponding vehicle is indicated by arrow B. The disc brake comprises a carrier member 12 which includes an inner plate 14, with respect to the corresponding vehicle, and an outer plate 16. Both plates 14 and 16 are approximately U-shaped and interconnected by two parallel arms 18 which extend slightly spaced outwardly from the outer edge of the brake disc 10 and each are formed with a cylindrical bore 20 in parallel with the axis A and open towards the inner side of the brake, with respect to the vehicle.

A sliding bolt 22 each is guided in the bores 20 and connected to the respective arm 18 by a bellows-type sealing boot 24. A floating caliper 28 is fastened releasably by a threaded bolt 26 each to the two sliding bolts 22. The floating caliper 28 straddles the outer edge of the brake disc 10 in the manner of a fist. This type of floating caliper also is referred to as fist-type caliper.

The floating caliper 28 is formed at the inner side with respect to the vehicle with an hydraulic cylinder 30 in which a piston 32 is guided. The piston 32 is provided for direct actuation of a brake pad 34 at the inner side with respect to the vehicle. An outer brake pad 34 with respect to the vehicle is positioned opposite the first brake pad at the other side of the brake disc 10 for actuation by displacement of the floating caliper 28.

The two brake pads 34 are fully identical. They each include a backplate 36 made of steel, a friction lining 38, and two lugs or projections 40 which are free of friction material. One of the two projections 40 of each backplate 36 has a cylindrical hole 42 and the other one a slit 44 which is open outwardly in circumferential direction. As both brake pads 34 are exactly alike, the slit 44 of the brake pad 34 which is operable directly by the piston 32 is confronted by the hole 42 of the other brake pad 34 which is operable indirectly by displacement of the floating caliper, and vice versa.

A guide pin 46 which is releasably mounted at the carrier member 12 is associated with each of the holes 42 and slits 44. For fixing, each guide pin 46 is formed with an internal thread 48 which threadingly receives a threaded bolt 50 inserted into the carrier member 12. In this manner one end 52 of each guide pin 46 is firmly clamped to the carrier member 12. Each guide pin 46 has a free end 54 which is spaced from the brake disc 10 by a distance which is the same as or slightly greater than the clearance to release the brake.

Each guide pin 46 is enclosed by a protective sleeve 56 the principal component of which, a bellows 58, is made of a corrosion-resistant metal alloy of spring elasticity.

The bellows 58 has an annular end 60 which is connected firmly and tightly by rivets to the free end 54 of the corresponding guide pin 46. In the embodiment shown, this free end 54 itself is designed as a rivet. The other end 62 of each protective sleeve 56 is of cylindrical configuration and extends through the associated hole 42 or the associated slit 44, respectively, up to the backside of the respective projection 40 where it is formed with a thickened flange- or bead-like formation 64.

Those guide pins 46 which pass through the cylindrical hole 42 of the corresponding brake pad 34 are guided in a guide bushing 66 which may be made, for example, of sintered metal and is pressed into the respective hole 42 in such manner that it simultaneously clamps the cylindrical end 62 of the corresponding protective sleeve 56.

The brake pressures exerted upon braking by the brake disc 10 on each of the two brake pads 34 are transmitted by each brake pad only through the associated guide bushing 66 to the guide pin 46 it surrounds. The other guide pin 46 which extends through the slit 44 of the same brake pad merely functions to avoid any pivoting of the brake pad.

The free end 54 of each guide pin 46 may be formed with a hexagon 68 for application of a wrench, preferably with a hexagonal recess, whereby the guide pins 46 may be prevented from rotating as the threaded bolts 50 are unscrewed for exchange of the brake pads 34. The guide pins 46 together with the protective sleeve 56 and guide bushing 66, if any, remain connected to the respective brake pad 34 to be replaced together with the same.

What is claimed is:

1. A disc brake, especially for motor vehicles, comprising a pair of brake pads (34), one each associated with either side of a brake disc (10) and at least one brake pad (34) thereof including a backplate (36) which has a projection (40) free of friction lining and serving to guide the brake pad on a guide pin (46) for displacement towards the brake disc (10), the guide pin being fixed to a carrier member (12) of the brake, passing through the corresponding projection (40) into a protective sleeve (56) fixed to the same, and having a free end (54) adjacent the brake disc (10),
    characterized in that the protective sleeve (56) is designed to be elastic in its longitudinal direction and has an end (60) remote from the corresponding projection (40) of the backplate (36) which end (60) is fixed tightly to the free end (54) of the associated guide pin (46), and in that the fastening of the guide pin (46) at the carrier member (12) is releasable.
2. The disc brake as claimed in claim 1,
    characterized in that the protective sleeve (56) comprises a bellows (58).
3. The disc brake as claimed in claim 2,
    characterized in that the bellows (58) is made of corrosion-resistant metal and, at the same time, is designed to act as a return spring for the corresponding brake pad (34).
4. The disc brake as claimed in one of claims 1 to 3,
    characterized in that the end (60) of the protective sleeve (56) remote from the projection (40) of the corresponding brake pad (34) is of annular configuration and riveted to the free end (54) of the associated guide pin (46).
5. The disc brake as claimed in one of claims 1 to 3,
    characterized in that the end (62) of the protective sleeve (56) fastened at the projection (40) is clamped by means of a guide bushing (66) enclosing the guide pin (46).
6. The disc brake as claimed in one of claims 1 to 3,
    characterized in that the end (62) of the protective sleeve (56) fastened at the projection (40) is designed itself as guide bushing for the guide pin (56).
7. The disc brake as claimed in one of claims 1 to 3,
    characterized in that the guide pin (46) has an internal thread (48) which threadingly receives a threaded bolt (50) fixed to the carrier member (12).

* * * * *